Feb. 17, 1970 C. J. HOLLOMAN 3,496,386
SIGNALING CIRCUIT
Filed Dec. 12, 1966
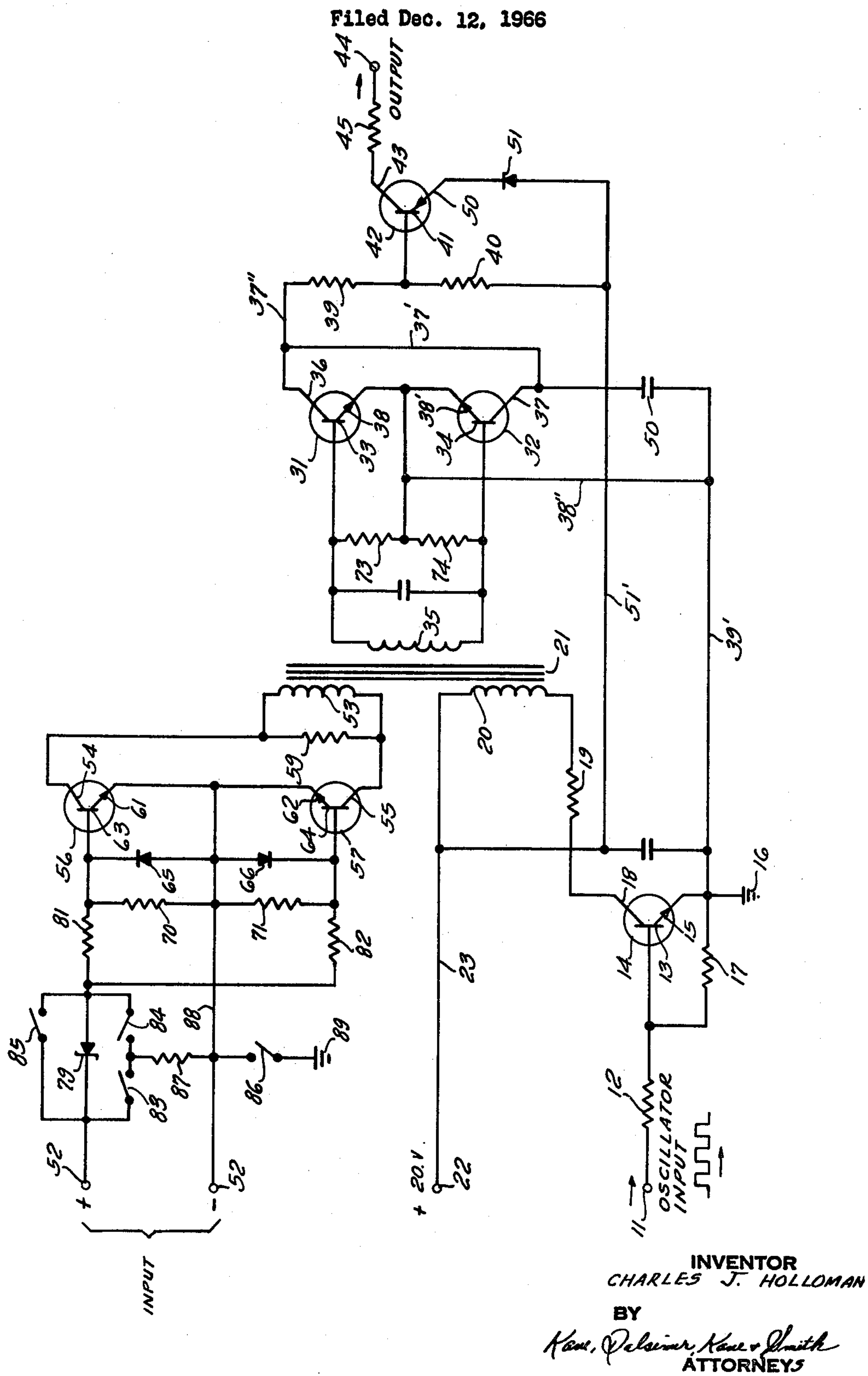
INVENTOR
CHARLES J. HOLLOMAN
BY
Kane, Dalsimer, Kane & Smith
ATTORNEYS United States Patent Office 3,496,386
Patented Feb. 17, 1970

3,496,386
SIGNALING CIRCUIT
Charles J. Holloman, Stamford, Conn., assignor to Trans-Lux Corporation, New York, N.Y., a corporation of Delaware
Filed Dec. 12, 1966, Ser. No. 600,901
Int. Cl. H03k 17/60
U.S. Cl. 307—254 6 Claims

ABSTRACT OF THE DISCLOSURE

A solid state D.C. to D.C. coupling circuit providing full isolation and substantially no noise transfer.

In many instances, where signaling information is supplied over a balanced input line it becomes necessary to supply such signals through a transducer feeding into unbalanced output. The present invention effectively provides a transition medium or static modulator by which it is possible to connect various forms of communication devices to a balanced input cable or wire pair where operation is maintained at relatively low frequency (at a frequency of say below 200 cycles per second) or at a pulsating direct current without creating a disturbance on the longitudinal belance of the line at higher frequencies.

The invention, as constituted, utilizes the combination of an input control circuit which is suitably driven by an oscillator developing energy of square wave formation at reasonably high frequencies (illustratively toward the upper end of the audio frequency range at about 10 kc.) and, with this, connecting a suitable detector unit for feeding a final output signal to the communication apparatus.

In a preferred arrangement of the circuit, square wave energy is supplied to one winding of a control transformer to which, on a second primary winding, the input signal is also supplied. The transformer secondary connects to an output circuit which preferably includes a suitable full-wave detector. The final output signal is transferred through a suitably connected direct current amplifier into a load circuit for energizing any desired form of controlled unit, such as a shift register circuit. The circuit is particularly for use in telegraph and data transmission practices according to various standards of operation.

When so constituted, the invention has as its primary objective that of providing a form of input isolation circuit which will improve the operational efficiency of the communication link and, at the same time, be extremely simple in its operation and arrangement. Other objects of the invention, of course, are those of maintaining a high-response fidelity with an efficient operation using only solid state components to provide the control.

The invention has been illustrated in its preferred form by the single figure of the accompanying drawing. Making reference now to the drawing for further understanding of the invention, generally square wave pulse energy from any desired oscillator input source (not shown) is provided at the input terminal 11. This energy is fed through resistor 12 to the base 13 of transistor 14. Transistor 14 is connected as a common emitter type of unit with its emitter 15 grounded at 16. The usual resistor 17 is connected between the base 13 and the emitter-ground 16.

Output from the transistor 14 is derived at its collector 18 and is supplied through resistor 19 to a primary winding 20 of transformer 21. Transformer 21 is preferably of the iron-core type operating at a relatively low frequency of the input (for instance, about 10 kc.).

A source of positive voltage (not shown) of about 20 v. is connected at terminal 22 and supplies a positive potential relative to ground on the collector 18 by way of conductor 23, the primary winding 20 and the resistor 19. The transformer serves to transfer simultaneously the pulse input provided at the transformer primary 20 to both its secondary winding 35 which connects into the detector circuit to be described and to the second primary winding 53 which serves as a control winding on the input signal supplied at terminals 52, as will later be described.

The detector circuit includes a pair of transistors 31 and 32 which, with resistors 73 and 74, provide a full-wave detector circuit. The transistors 31 and 32 have their base elements 33 and 34, respectively, connected to the outer ends of the transformer winding 35. The emitter elements 38, 38' connect together and to ground 16 by way of the conductors 38'' and 39'. The collector elements 36 and 37 also are connected together by way of the conductor 37' and provide a common output on the conductor 37''. Output signals are supplied through resistor 39 and across resistor 40, forming a voltage divider, to the base 41 of an output transistor 42. This transistor, as can be seen, is direct-connected to the output of the transistors 31 and 32 serving as detector elements.

In respect of the connected arrangement, the capacitor 50 connects to the collectors 36 and 37 and to ground 16 by way of conductor 39'. The capacitor serves to compensate for rise time losses produced within the transformer 21 by any introduced integrating effects.

The transistor 42 is direct-connected to the detector output and servies as a D.C. amplifier. Output signal energy is derived at the collector 43 and available at the output terminal 44 through resistor 45. The emitter element 50 connects through the diode 51 and conductors 51' and 23 to the input terminal 22 whereat a positive voltage, illustratively, of the order of about 20 volts relative to ground is applied.

At the same time that the pulse signals at terminal 11 are transferred to the control winding 35, they also are induced ino the winding 53 and across the collector elements 54 and 55 of transistors 56 and 57. The collector elements 54 and 55 are connected to opposite outer terminals of the transformer winding 53. A resistor 59 (later to be discussed to a further extent) shunts the complete winding 53. The transistors 56 and 57 have their emitter elements 61 and 62 connected together and to one of the signal input terminals 52. The base elements 63 and 64 of these transistors are connected to receive the input signals from terminal 52 in phase with each other. The base-emitter path of each transistor 56 and 57 is shunted by a diode 65 or 66 which provides the completion of the emitter base path for each transistor, it being noted that the diodes have the cathode elements connected to the base of the respective transistors and the anode elements connected together and to the second input terminal 52. The diodes and the base-emitter paths are shunted by resistor elements 70 and 71.

The diodes 65 and 66 are believed to have several significant effects in the circuit. First of all, they insure a symmetrical loading on the input regardless of the input polarities at terminals 52. They also prevent excessive back-voltage on the transistors 56 and 57 and, in addition, they provide a convenient return path.

Considering now the circuit to a further extent, if conditions occur where the input signal from the terminals 52 is of such polarity as to bias the bases off with respect to their emitters, the circuit will be seen to form a high impedance as determined by the value of the resistor 59 across the winding 53. However, during a one-half cycle period of the input signals at winding 53, the collector base junction acts as a forward biased diode so that the alternate transistor is non-conducting. The back-bias for the non-conducting transistor is then developed across the diodes 65 and 66.

If now the input signal polarity available at the terminals of winding 53 is such as to cause the transistors 56 and 57 to have the emitter-base junctions biased forward, then the action of the circuit (assuming the upper terminal of transformer winding be positive and the lower terminal be negative) is such that there exists a low impedance path, for instance, through transistor 56 by virtue of the base-emitter current flowing through diode 66 and the base-collector junction of transistor 57 to the lower terminal of the transformer winding 53. If, for these conditions, the collector current through transistor 57 is lower than the base-emitter junction current, then there is also a low impedance path from the emitter 61 of transistor 56 directly through the emitter collector path of the transistor 57.

For the other half-cycle, the reverse conditions occur. Under these conditions, the diodes 65 and 66 provide both the back-bias for non-conduction and an auxiliary path for the conducting portion of the cycle where the collector currents are high. In this instance, the collector currents are limited by the gain of the transistors 56 and 57 and this is equal to one-half the gain factor times the control current applied. Then, when transistors 56 and 57 are conducting, the impedance across the transformer winding 53 is very low (actually, according to the described operation, less than about one volt). This voltage is transformed by the square turns ratio of the windings 20 and 53. At this time, the driver signal from terminal 11 will be dissipated in the resistor 19 connected between the collector 18 of transistor 14 and the winding 20. For such conditions, very little energy is transferred into transformer winding 35. The transistors 31 and 32 for the conditions stated preferably consist of silicon junctions, or they may be of the germanium type with a biasing diode in series with either the base or the emitter.

For the conditions last stated, the signal across the secondary winding 35 is divided between resistors 73 and 74 which are serially connected across the winding 35 with their end terminals connected to the bases 33 and 34 of diodes 31 and 32 and the outer terminals of winding 35. There is also a connection from approximately the junction point to the emitters 38 and 38' to ground 16 by way of conductors 38'' and 39'. With the described conditions obtaining, one-half of the signal across the winding 35 must exceed the emitter-base junction of transistors 31 and 32 before conduction can occur. Unless transistors 31 and 32 are in a conducting state, it can be appreciated that the output transistor 43, which supplies its output energy to the terminal 44, is non-conducting.

The turns ratio of the windings 20, 35 and 53 of the transformer 21 is established at a suitable value to prevent excessive voltage from developing across the winding 35 when the winding 53 is at a low impedance. For conditions where silicon components are used, the voltage across the winding 53 is typically about one volt. For this condition, the junction of transistors 31 and 32 is then about 0.5 volts, and, at this time, the winding 35 should be less than one volt. The turns ratio of the winding 53 to winding 35 must be greater than unity. The winding 20 should be adjusted to provide a reasonable current flow through transistors 56 and 57.

In one typical case, the input control current is about one milliampere, although this is not a limitation on the system.

It might also be pointed out that the voltage across the collector-base junctions of transistors 56, 57 and 42 is limited by their respective voltage ratings. The transfer of energy from the input 52 to the output 44 then occurs in accordance with the conditions obtaining at the transformer winding and the conductive states of the transistors. The Zener diode 79 included in the input circuit and the load resistor associated therewith can be adjusted to accommodate any code format to operate with any two-level system. Thus, it can be expected that the described circuitry will handle all signal techniques and is non-restrictive in code format and is, therefore, usable with any of uni-polar, bi-polar, neutral current and polar current operations, which are currently used to a considerable extent for telegraph and data transmission.

Various types of connections may be provided by the input shown. This input is applied at the terminals 52 with the mark condition illustratively indicated by the + sign and the space indicated either by the − sign or a ground potential is provided so that the mark signal feeds through the Zener diode 79 and then, through the input resistors 81 and 82 to bases 63 or 64 of the transistors 56 or 57.

It can be seen from the arrangement of the several switches 83, 84, 85 and 86 that different operating conditions can be arrived at when the switches are opened or closed. Illustratively, if the switch 83 is closed, it will be apparent that there is a resistive path provided through resistor 87 to the other side of the line or ground. This provides a condition which might illustratively be used for one operational type but not for another. Further than this, if it be desired to provide the effect of short-circuiting the Zener diode 79, this can be done by closing the switch 85. On the other hand, the Zener diode can also be short-circuited but is provided with a shunt path to ground through resistor 87 by closing each of switches 83 and 84. Closure of one of the switches 83 or 84 without the other and with the switch 85 open will connect the shunting resistor 87 either ahead or behind the Zener. Furthermore, in some instances, it is desirable, particularly where the input should happen to be an unbalanced unipolar form, to provide that the conductor 88, which connects to the junction of the emitters 61 and 62 and the anode elements of the diodes 65 and 66, may be closed to provide a connection to ground at 89. These conditions, as will be appreciated, provide for typical operations where a fully symmetrical type of operation is desired as, for instance, for long cable work. They also provide for conditions where a short local circuit or a computer-typeoperation is desired. In other instances, they provide types of operations where the use is particularly in connection with telegraphs and the intention is to deal with exposed or noise-unbalanced cables. In other types of connections, the use has been found best for teletypes. In some instances, it will be noted that there it has been assumed that the marking condition is +. However, it is to be understood that if the connections are reversed, marking conditions might be had by a negative connection.

Considering this operation further, it becomes a significant feature of the invention to prevent high frequency noise from being transferred through the transformer 21 into the detector circuit, particularly during the non-saturated transitions. This is achieved by the symmetrical operation of the transistors, as diagrammed. Next, it may be noted that the symmetrical type of arrangement of the input circuit prevents the oscillator signals from feeding back into the input line.

While the invention is described in its preferred form, it will be apparent that various modifications may be made in the described arrangement within the spirit and scope of what is herein set forth without departing from either the spirit or scope of the claims to follow.

Having now described the invention what is claimed is:

1. A balanced static modulator circuit comprising
   a transformer having a pair of primary windings and a secondary winding coupled together,
   means to introduce pulse energy of a selected frequency into one of the primary windings to simultaneously energize the other primary winding and the secondary winding, full-wave rectifier means connected to respond to voltages induced through the secondary winding, a pair of signal transducer elements having their output electrodes connected at opposite ends of the second transformer primary winding and their input electrodes adapted to be connected in parallel to a signal source, impedance means connected in parallel with the last-named transformer primary winding and between the output electrodes of said transducers, one input signal polarity being adapted to bias the said transducers to a non-conducting state where the circuit presents a high impedance, the opposite input signal polarity being adapted to bias the said transducers in a forward fashion to provide a low impedance path through said transducers, a rectifier means shunting the input to each transducer to provide back-bias for non-conduction periods in the associated transducer and an auxiliary path for conducting periods, the transformer turns ratio being such that with the transducers in a conductive state the impedance across the second primary transformer winding is low and a minimal transfer occurs through the transformer, detector means receiving the output of said full wave rectifier to be actuated by the input signal to provide condition at selected time periods, and a load circuit connected to the detector.

2. The circuit claimed in claim 1 comprising, in addition, means to introduce the pulse energy as substantially square wave formations.

3. The circuit claimed in claim 1 comprising, in addition, means to compensate for rise time losses in the transformer.

4. The circuit claimed in claim 3 wherein the compensating means comprise a capacitor.

5. The circuit claimed in claim 1 comprising, in addition, current limiting means included in the signal input circuit.

6. The circuit claimed in claim 1 comprising, in addition, transistor means for directly connecting the load circuit to the detector means.

References Cited

UNITED STATES PATENTS 3,071,699 1/1963 Eckl.

JOHN S. HEYMAN, Primary Examiner

B. P. DAVIS, Assistant Examiner

U.S. Cl. X.R.

307—232, 296